United States Patent
Bacouelle et al.

(10) Patent No.: US 6,362,420 B1
(45) Date of Patent: Mar. 26, 2002

(54) HIGH-CAPACITY MULTICOMPARTMENT ELECTRICAL WIRING TRUNKING

(75) Inventors: Hervé Bacouelle, Senlis (FR); David Dowd, North Syracuse, NY (US)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/518,229

(22) Filed: Mar. 2, 2000

(30) Foreign Application Priority Data

Jan. 21, 2000 (FR) .............................................. 00 00779

(51) Int. Cl.⁷ ................................................. H02G 3/04
(52) U.S. Cl. ........................... 174/48; 174/49; 174/68.3; 52/220.7; 439/207
(58) Field of Search ............................... 174/48, 49, 50, 174/68.1, 68.3, 72 A, 72 R, 72 C, 97, 96; 52/220.1, 220.3, 220.5, 220.7, 239; 220/3.2, 4.02, 3.7; 439/207; 138/111, 166

(56) References Cited

U.S. PATENT DOCUMENTS

| | | | | |
|---|---|---|---|---|
| 4,703,985 A | * | 11/1987 | Finkbeiner et al. | 439/207 |
| 5,277,007 A | * | 1/1994 | Hellwig et al. | 52/220.7 |
| 6,037,538 A | * | 3/2000 | Brooks | 174/48 |

FOREIGN PATENT DOCUMENTS

| | | | | |
|---|---|---|---|---|
| EP | 0460906 | * | 12/1991 | 174/48 |
| FR | 2 660 120 | | 9/1991 | |
| GB | 2203900 | * | 10/1988 | 174/48 |
| GB | 2 289 292 | | 11/1995 | |

* cited by examiner

Primary Examiner—Dean A. Reichard
Assistant Examiner—Dhiru R Patel
(74) Attorney, Agent, or Firm—Browdy and Neimark P.L.L.C.

(57) ABSTRACT

Electrical wiring trunking includes at least first and second cable running compartments extending parallel to each other in a general lengthwise direction of the trunking and separated from each other by a fixed insulative partition. The partition includes at least one communication opening between the first and second compartments. An electrical insulation box has a lateral wall with a lateral access opening mounted in the first compartment so that its lateral access opening coincides with the communication opening. The space inside the box forms an extension of the second compartment into the first compartment which is electrically insulated from the first compartment and receives an electrical accessory to be connected to electrical cables running in the second compartment.

12 Claims, 3 Drawing Sheets

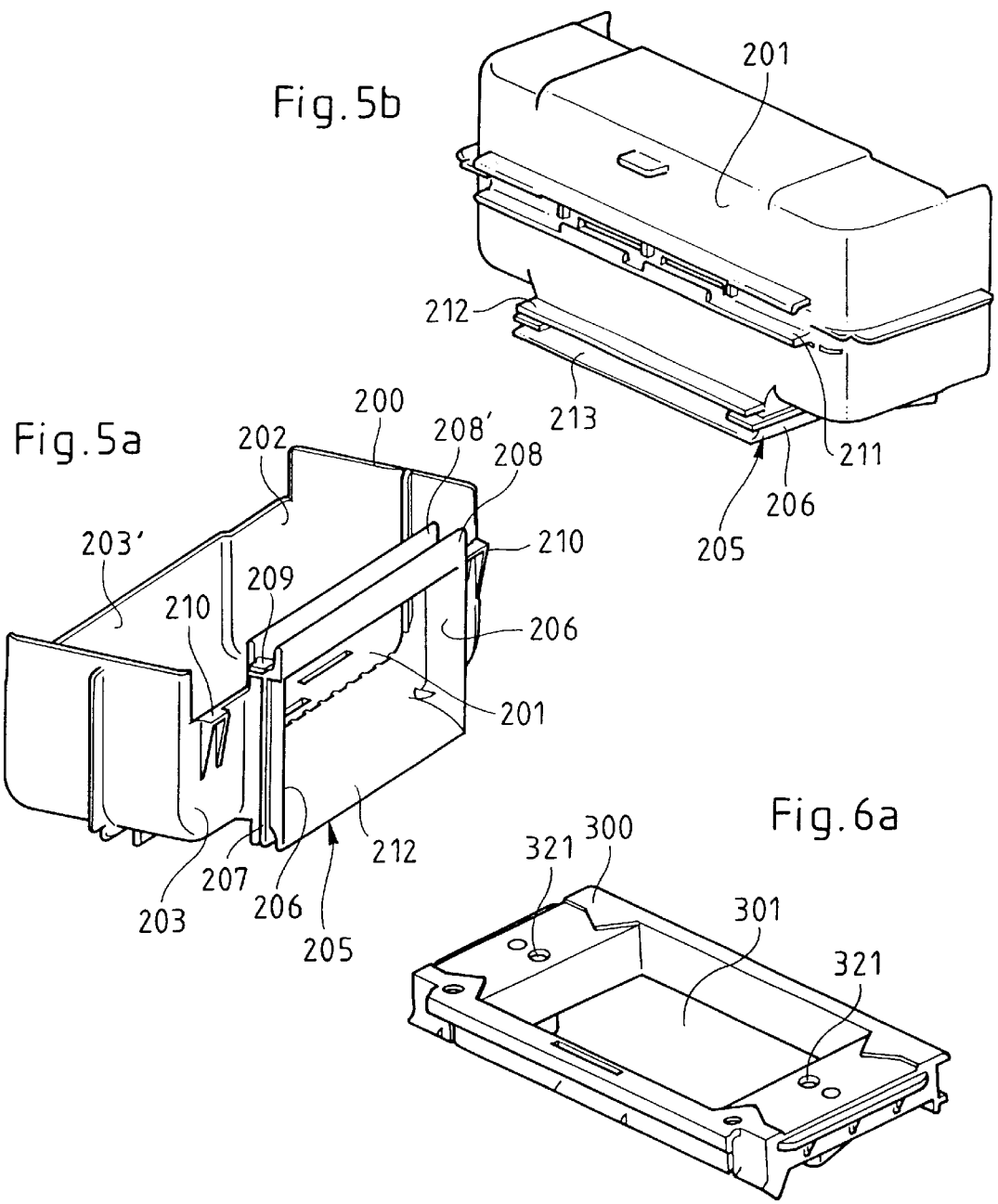
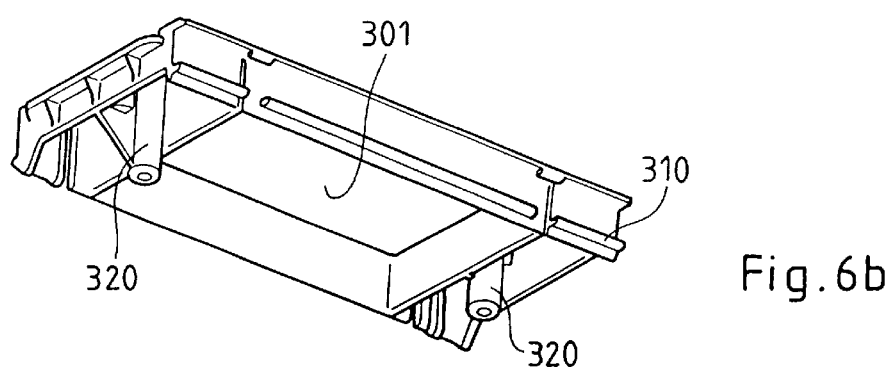

HIGH-CAPACITY MULTICOMPARTMENT ELECTRICAL WIRING TRUNKING

BACKGROUND OF THE INVENTION

1. Field of the Invention

The present invention relates generally to multicompartment electrical wiring trunking for running cables.

It relates more particularly to electrical wiring trunking which includes at least first and second cable running compartments extending parallel to each other in a general lengthwise direction of the trunking and separated from each other by a fixed insulative partition which includes at least one communication opening between the first and second compartments.

As a general rule, "high" current cables, i.e. power supply cables connected to the AC line voltage, are run in one compartment of multicompartment wiring trunking and "low" current cables, i.e. telephone or computer network cables, are run in another compartment.

Electrical accessories, in particular "high" current and "low" current socket outlets, connected to the cables that run in the various compartments of the wiring trunking are mounted in the same compartment as the cables to which they are connected.

However, this reduces the wiring capacity of the trunking.

2. Description of the Prior Art

There are several prior art solutions to the problem of increasing the wiring capacity of this kind of multicompartment wiring trunking.

A first solution is to increase the dimensions of one of the compartments.

A second solution is to use an electrical accessory support external to the wiring trunking.

Neither of these solutions is satisfactory because they increase the overall outside dimensions of the wiring trunking fitted with its electrical accessories, at least locally.

Documents FR 2 660 120 and GB 2 289 292 describe another solution to the problem of the wiring capacity of wiring trunking which provides a third compartment between two cable running compartments adapted to receive all the electrical accessories to be connected to the cables run in the aforementioned two compartments, the third compartment being separated from the other compartments by insulative partitions with openings for communication between the respective compartments enabling a cable in one of the two cable running compartments to be fed into the third compartment to connect it to an electrical accessory.

Apart from the fact that this solution also increases the width or height of the wiring trunking, it does not provide good electrical insulation between "high" current cables and "low" current cables, because these must cohabit in the central third compartment, with no particular separation between them, in order to be connected to juxtaposed electrical accessories in said compartment.

With a view to remedying the aforementioned drawback, the invention proposes a new solution to the problem of the wiring capacity of multicompartment electrical wiring trunking which does not increase its overall outside dimensions and provides perfect electrical insulation between "heavy" current cables and "light" current cables so as to conform to the provisions of the applicable standards.

SUMMARY OF THE INVENTION

To be more precise, the invention proposes electrical wiring trunking including at least first and second cable running compartments extending parallel to each other in a general lengthwise direction of the trunking and separated from each other by a fixed insulative partition which includes at least one communication opening between the first and second compartments and an electrical insulation box having a lateral wall with a lateral access opening mounted in the first compartment so that its lateral access opening coincides with the communication opening and the space inside the box forms an extension of the second compartment into the first compartment which is electrically insulated from the first compartment and adapted to receive an electrical accessory to be connected to electrical cables running in the second compartment.

Thus, in accordance with the invention, it is advantageously possible to place all of the electrical accessories of the electrical wiring trunking in one of its cable running compartments, in order to free up the others and thereby increase their wiring capacity.

In practice, it is usually the "low" current cable running compartment that is freed of electrical accessories, which are placed in the "high" current cable running compartment, because it is the "low" current cable running compartment whose wiring capacity must be increased to serve a greater number of computers or telephones.

Other non-limiting and advantageous features of the electrical wiring trunking in accordance with the invention are as follows:

- each communication opening can be made as and when required by cutting the insulative partition;
- each communication opening can be formed integrally with the insulative partition, in which case it may be advantageous to fill in each communication opening with a removable partition portion to enable the wiring trunking to be used as standard wiring trunking and to expose each communication opening as and when required to increase the capacity of one compartment of the trunking;
- the electrical insulation box also has, in addition to its lateral access opening, a front access opening adapted to receive an electrical accessory support plate;
- the electrical insulation box has on its lateral wall incorporating the lateral access opening means for clipping the box to the insulative partition;
- the electrical accessory support plate is clipped to the wiring trunking in such a manner as to hold the electrical insulation box in position in the corresponding compartment of the trunking;
- the electrical insulation box can have on the outside face of its back wall means for clipping it to a longitudinal rail provided on the back of the corresponding compartment of the wiring trunking;
- the lateral access opening of the electrical insulation box can be defined within a frame projecting from the corresponding lateral wall of the electrical insulation box;
- the frame advantageously has two parallel lateral uprights forming right-angle rims on the lateral wall of the insulation box and carrying on their outside face means for locating the frame in the communication opening of the insulative partition so that the lateral access opening of the electrical insulation box coincides with the communication opening;
- the frame advantageously also includes a longitudinal beam delimiting both one side of the lateral access opening and one side of the front access opening and carrying at its ends a finger for locating the frame in the communication opening adapted to engage in an appropriate channel on the insulative partition so that the beam is locally substituted for an upper part of the insulative partition;

the beam can be formed integrally with the electrical insulation box or attached to the electrical insulation box to facilitate connecting electrical cables running in the second compartment to the electrical accessory in the electrical insulation box and to avoid tangling the cables.

The following description with reference to the accompanying drawings, which are provided by way of non-limiting example, explains in what the invention consists and how it can be put into effect.

BRIEF DESCRIPTION OF THE DRAWINGS

FIGS. 5a and 5b are respectively side and bottom perspective views of an electrical insulation box of wiring trunking according to the invention.

FIGS. 6a and 6b are top and bottom views of an electrical accessory support plate of wiring trunking according to the invention.

DETAILED DESCRIPTION OF THE PREFERRED EMBODIMENT

Figure 1:
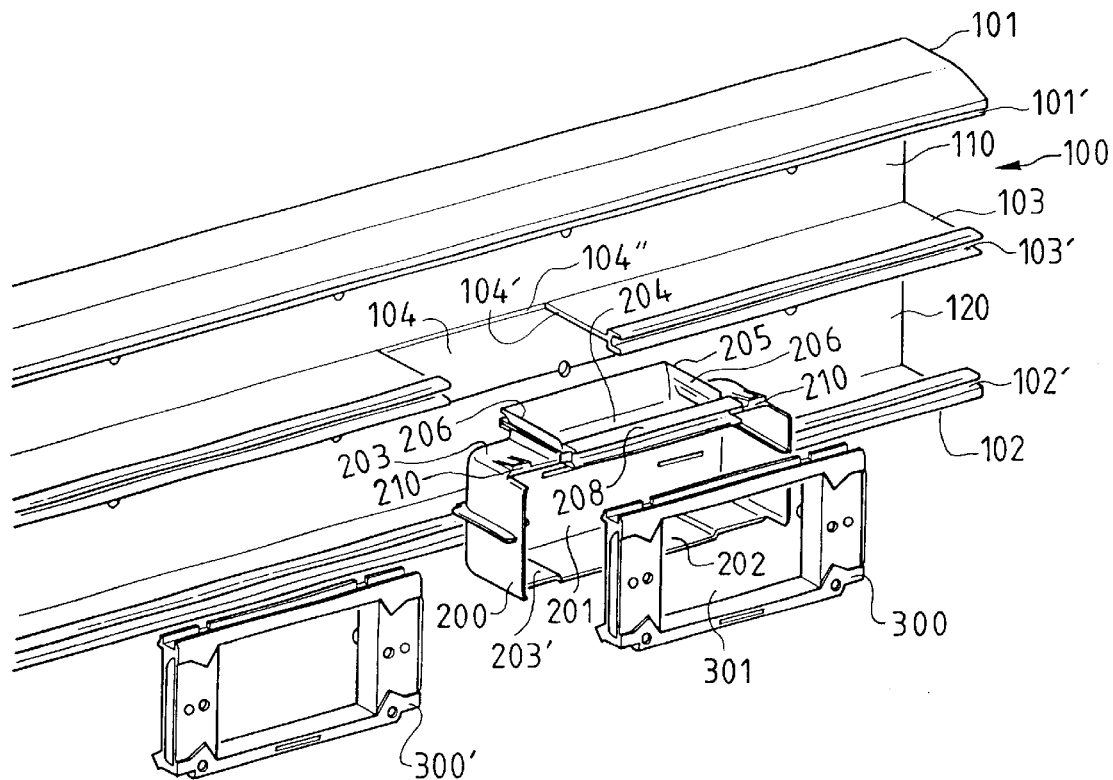
FIG. 1 is an exploded perspective view of part of electrical wiring trunking according to the invention.

FIGS. 1 to 4 show multicompartment electrical wiring trunking 100 which is preferably made by extruding a plastics material and which has first and second cable running compartments 120, 110 extending parallel to each other in the general lengthwise direction of said trunking.

The first compartment 120 is a compartment for running "high" current cables, i.e. cables connected to the 110 V or 230 V AC line voltage.

The second compartment 110 is a compartment for running "low" current cables, i.e. telephone network or computer network cables.

The first and second cable running compartments 120, 110 are separated from each other by a fixed insulative partition 103.

Here the insulative partition 103 is preferably an integral part of the wiring trunking 100, in other words it is formed by being extruded with the trunking.

Of course, in a variant that is not shown the insulative partition 103 could be initially separate and then fixed permanently to the wiring trunking. This could be the case with wiring trunking made of metal, for example aluminum, with an attached plastics material insulative partition.

The insulative partition 103 has a U-shaped cross section longitudinal channel 103' at the top delimited by two parallel longitudinal walls 103" and into which clips either a cover 150 of a compartment 110 or an electrical accessory support plate 300, 300', as described in more detail later.

The cable running compartment 110 is delimited between a back wall, an outside lateral wall 101 of the trunking 100 and the insulative partition 103 and the cable running compartment 120 is delimited between a back wall, the insulative partition 103 and the other outside lateral wall 102 of the trunking 100.

Each compartment 110, 120 has a U-shaped section, the outside lateral walls 101, 102 of the wiring trunking 100 here having rims 101', 102' extending transversely to the lengthwise direction of the trunking toward the interior thereof and each forming a longitudinal channel in which can be mounted clipping means for a cover 150 or an electrical accessory support plate 300.

Figure 3:
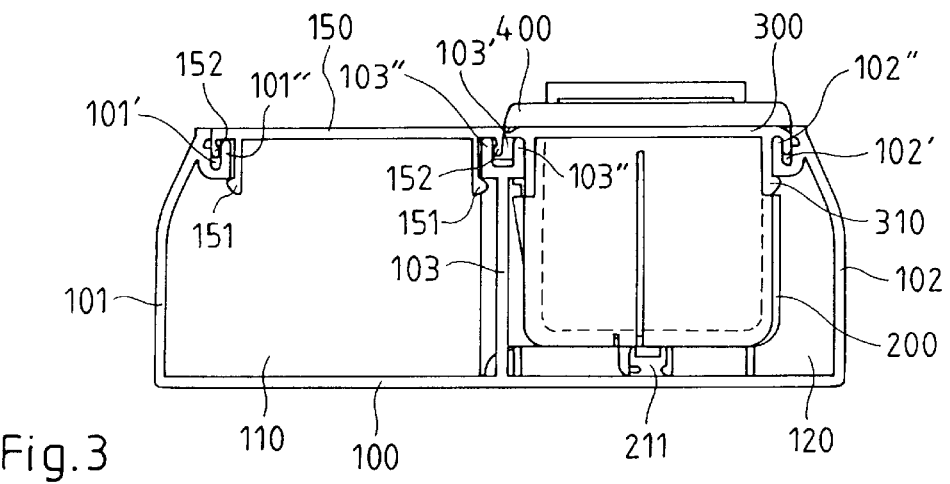
FIG. 3 is an end view of the wiring trunking shown in FIG. 2 with one of its two compartments fitted with a cover.

In particular, and as shown in FIG. 3 more particularly, the cover 150 of the compartment 110 of the wiring trunking 100 has clipping lugs 151, 152 on its parallel longitudinal edges which, by deforming elastically, sandwich a longitudinal wall 103" of the channel 103' on the insulative partition 103 and the inside wall 101" of the rim 101' on the outside lateral wall 101 of the corresponding compartment 110 of the wiring trunking 100.

As shown in FIG. 3, each electrical accessory support plate 300, 300' mounted in the other compartment 120 of the wiring trunking 100 also has on its longitudinal edges clipping beads and teeth 310 which, by deforming elastically, lock under the channel 103' on the insulative partition 103 and sandwich the inside wall 102" of the rim 102' on the outside lateral wall 102 of the corresponding compartment 120 of the wiring trunking 100.

In this regard, the longitudinal walls 103" of channel 103' on the insulative partition 103 projects from both sides of partition 103 to form outer rims beneath which clip the clipping lugs of a cover 150 or the clipping beads and teeth of an electrical accessory support plate 300.

The illustrative partition 103 here advantageously includes a communication opening 104 between the first and second compartments 120, 110.

The insulative partition 103 can of course include a plurality of communication openings of the same type.

Each communication opening 104 can be made as required by cutting said insulative partition 103 using an appropriate cutting tool.

It can instead be formed in said insulative partition during its manufacture.

In this case, removable insulative partition portions can advantageously be provided which temporarily fill in said communication openings to enable "standard" use of the multicompartment wiring trunking, each removable insulative partition portion being removed if required to expose the corresponding communication opening 104 if it proves necessary to increase the wiring capacity of one of the compartments of said wiring trunking.

Associated with the communication opening 104 is an electrical insulation box 200 having a lateral wall 203 in which there is a lateral access opening 204.

As shown in FIGS. 1 to 4 in particular, here the electrical insulation box 200 is mounted in the first compartment 120 so that its lateral access opening 204 coincides with said communication opening 104, the space inside the box 200 forming an extension of the second compartment 110 into the first compartment 120 which is electrically insulated from the first compartment 120 and adapted to receive an electrical accessory 1 to be connected to electrical cables running in the second compartment 110.

By transferring into the first compartment 120 electrical accessories to be connected to the electrical cables running in the second compartment 110 in this way it is possible to increase the wiring capacity of the second compartment 110 because the space therein normally occupied by the electrical accessories is freed up and is occupied in the first compartment 120 instead.

Figure 2:
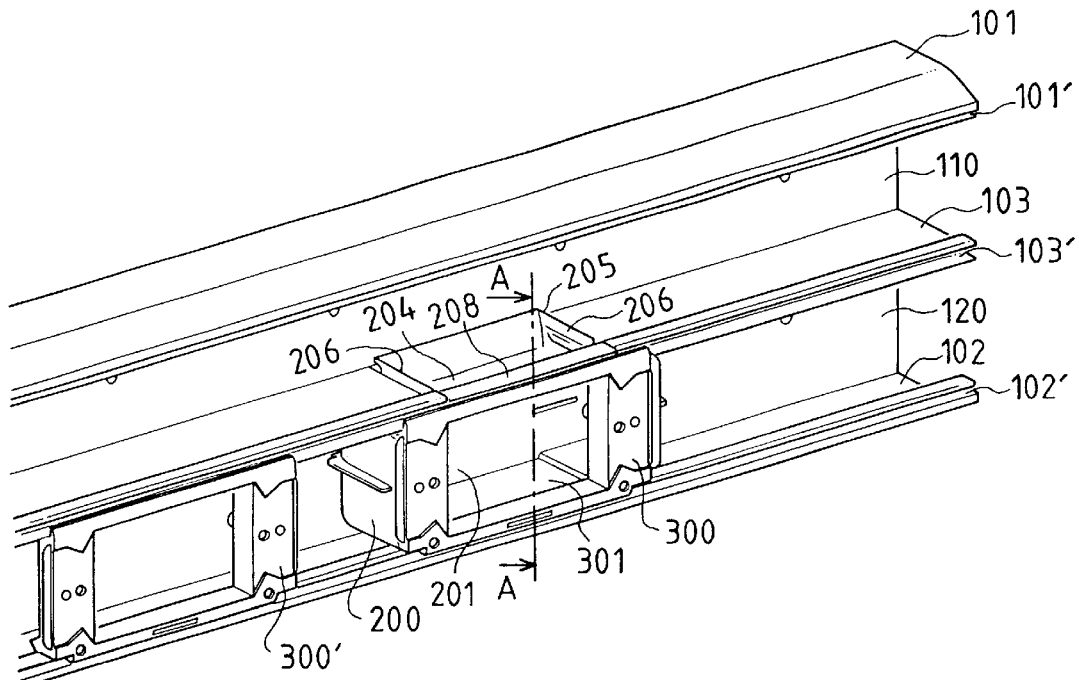
FIG. 2 is a perspective view from above of part of electrical wiring trunking according to the invention.

As shown in FIG. 2 in particular, the first compartment 120 advantageously receives a support plate 300' for an electrical accessory to be connected to "high" current cables running in that compartment and a support plate 300 for an electrical accessory to be connected to "low" current cables running in the second compartment 110, the support plate 300 then closing the corresponding electrical insulation box 200 containing said electrical accessory.

Each support plate 300, 300' carrying an electrical accessory is covered with a decorative and protective front plate 400.

The "high" current cables in the first compartment 120 run in the remaining space between the electrical insulation box 200 and the outside lateral wall 102 of the wiring trunking.

Figure 4:
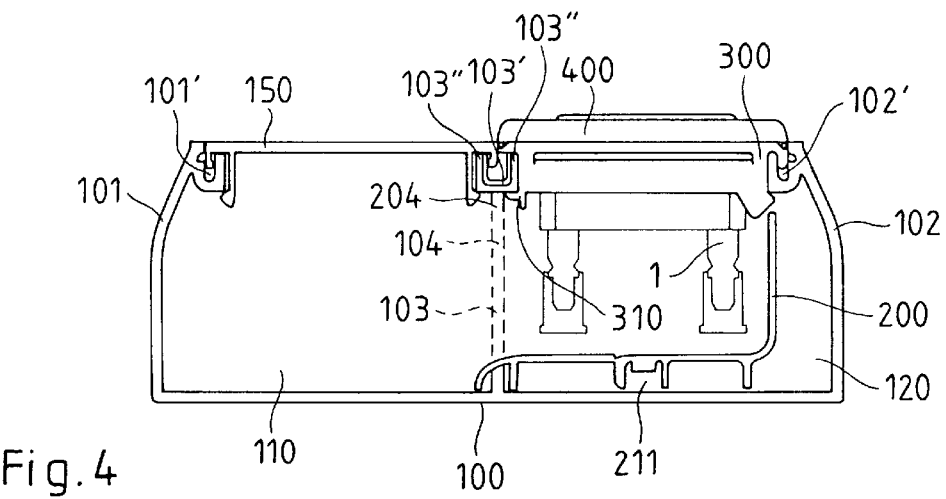
FIG. 4 is a view of the wiring trunking shown in FIG. 2 in section taken along the line A—A and with a cover fitted to the compartment which does not contain electrical accessories.

More particularly, and as shown in FIGS. 5a, 5b, 6b, 6a, the electrical insulation box 200 has, in addition to its lateral access opening 204, a front access opening 202 receiving the support plate 300 of an electrical accessory 1 (see FIG. 4). To this end the support plate 300 has wells 321 formed in columns 320 into which are screwed screws for fixing said electrical accessory to said plate.

As already described, the electrical accessory support plate 300 is clipped to the wiring trunking in such a manner as to hold the electrical insulation box 200 in position in the corresponding compartment 120 of said trunking 100. In particular, the support plate 300 immobilizes the electrical insulation box 200 placed in the compartment 120 in the heightwise direction.

The support plate 300 has an opening 301 receiving the electrical accessory 1. The opening 301 coincides with the front access opening 202 of the electrical insulation box 200 when said plate is clipped to the trunking.

The electrical insulation box 200 also has on its lateral wall 203 including the lateral access opening 204 means 210 for clipping it to said insulative partition.

More particularly, the clipping means 210 include two elastically deformable tongues on respective opposite sides of the lateral access opening 204 and supported by stiffener ribs on said lateral wall 203, the deformable tongues 210 being positioned by virtue of deforming elastically under an outside rim formed by the longitudinal channel 103' on the insulative partition 103 (see FIG. 7), leaving some play in the heightwise direction to enable the clipping means of the support plate 300 to fit under the channel 103'.

Also, and as shown in FIGS. 5a and 5b in particular, the electrical insulation box 200 has on the outside face of its back wall 201 means 211 for clipping it to a longitudinal rail provided in the back of the corresponding compartment of the wiring trunking, the rail having a generally T-shaped cross section, for example.

Here, in the embodiment shown, the corresponding cable running compartment 120 has no such longitudinal rail.

The clipping means 211 include a groove defined between facing walls carrying clipping teeth and abutments.

The lateral access opening 204 of the electrical insulation box 200 is defined within a frame 205 projecting from the corresponding lateral wall 203 of said electrical insulation box 200.

The frame 205 has two parallel lateral uprights 206 forming right-angle rims of said lateral wall 204 of the insulation box 200 which carry on their outside face means for positioning the frame in the communication opening 104 of the insulative partition 103 so that said lateral access opening 204 of the insulation box 200 coincides with said communication opening, i.e. it is partially substituted for said communication opening, which is wider than the lateral access opening 204 to receive the frame 205 in question.

Figure 7:
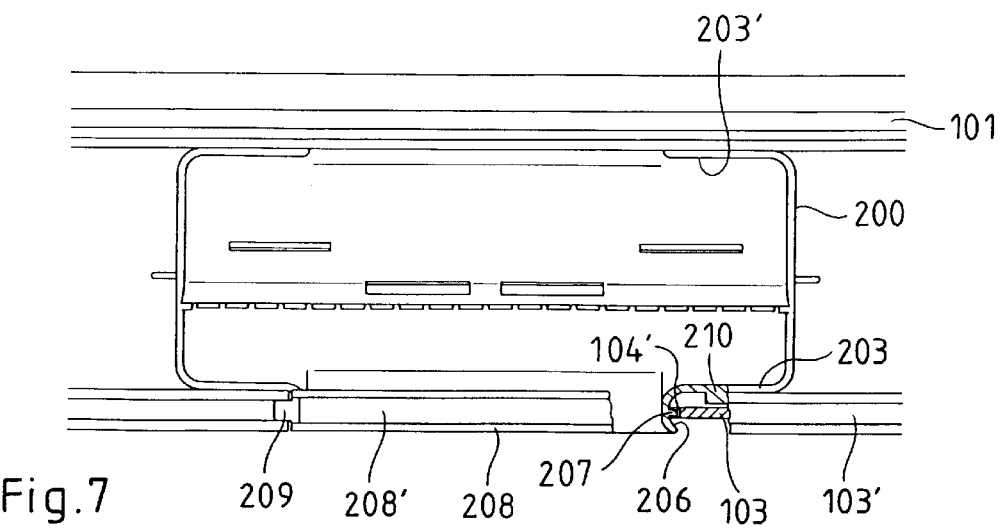
FIG. 7 is a top view showing the electrical insulation box fitted into a compartment of wiring trunking according to the invention, partly cut away where the frame delimiting a lateral access opening of the electrical insulation box is joined to an insulative partition of the wiring trunking.

As shown in FIG. 7 in particular, the positioning means include a longitudinal rib 207 extending along the middle of the length of each lateral upright 206 and locating against the corresponding edge 104' of the communication opening 104 of the insulative partition 103.

The ribs 207 also provide electrical insulation continuity between the two compartments at the location of the communication opening 104.

The frame 205 also includes a longitudinal beam 208 delimiting both one side of the lateral access opening 204 and one side of the front access opening 202.

The beam 208 is the same width as the channel 103' on the insulative partition 103 and the beam has on the face opposite that facing toward the opening 204 of the electrical insulation box a channel 208' identical to the channel 103' on the insulative partition 103.

The beam has at each end a locating finger 209 extending along its axis and adapted to engage in the channel 103' on the insulative partition 103 so that the beam 208 is locally substituted for the top part of the insulative partition 103.

Here the beam 208 is molded in one piece with the electrical insulation box but it could advantageously be attached to the insulation box when placed in the first compartment 120 of the wiring trunking 100 to provide easy access to the inside of the box before fitting said beam to connect cables running in the second compartment 110 to the electrical accessory in the electrical insulation box and to avoid tangling the cables.

The beam 208 fastened to the lateral uprights of the frame of the electrical insulation box provides continuity of the insulative partition 103 above the lateral access opening 204 substituted for the communication opening 104 and through which pass the cables to be connected to the corresponding electrical accessory mounted in the electrical insulation box.

Finally, the frame 205 has a longitudinal bottom part 212 parallel to the beam 208 and having on its bottom face a groove 213 in which the bottom longitudinal edge 104" of the communication opening 104 engages when the electrical insulation box 200 is fitted into the compartment 120. This also contributes to locating the lateral access opening 204 correctly in front of the communication opening 104 of the insulative partition and provides "tight" insulation at this location between the interior of the insulation box 200 and the interior of said compartment 120.

Finally, the top edge of the lateral wall 203' of the electrical insulation box has a recessed part which locates under the rim 102' on the outside lateral wall 102 of the wiring trunking 100 so that the insulation box provides a perfect electrical "seal" between its interior space and the interior space of the first compartment 120 in which it is mounted.

The present invention is in no way limited to the embodiment described and shown, to which the skilled person will know how to make many modifications that do not depart from the scope of the invention.

What is claimed is:

1. Electrical wiring trunking including at least first and second cable running compartments extending parallel to each other in a general lengthwise direction of said trunking and separated from each other by a fixed insulative partition which includes at least one communication opening between said first and second compartments and an electrical insulation box having a lateral wall with a lateral access opening mounted in said first compartment so that said lateral access opening coincides with said at least one communication opening and the space inside said box forms an extension of said second compartment into said first compartment which is electrically insulated from said first compartment and adapted to receive an electrical accessory to be connected to electrical cables running in said second compartment.

2. The wiring trunking claimed in claim 1 wherein said at least one communication opening is made as and when required by cutting said insulative partition.

3. The wiring trunking claimed in claim 1 wherein said at least one communication opening is formed integrally with said insulative partition.

4. The wiring trunking claimed in claim 1 wherein said electrical insulation box also has, in addition to said lateral access opening, a front access opening adapted to receive an electrical accessory support plate.

5. The wiring trunking claimed in claim 1 wherein said electrical insulation box has on said lateral wall incorporating said lateral access opening means for clipping said box to said insulative partition.

6. The wiring trunking claimed in claim 1 wherein said electrical accessory support plate is clipped to said wiring trunking in such a manner as to hold said electrical insulation box in position in the corresponding compartment of said trunking.

7. The wiring trunking claimed in claim 1 wherein said lateral access opening of said electrical insulation box is defined within a frame projecting from the corresponding lateral wall of said electrical insulation box.

8. The wiring trunking claimed in claim 7 wherein said frame has two parallel lateral uprights forming right-angle rims on said lateral wall of said insulation box and carrying on their outside face means for locating said frame in said at least one communication opening of said insulative partition so that said lateral access opening of said electrical insulation box coincides with said communication opening.

9. The wiring trunking claimed in claim 7 wherein said frame includes a longitudinal beam delimiting both one side of said lateral access opening and one side of said front access opening and carrying at its ends a finger for locating said frame in said at least one communication opening adapted to engage in an appropriate channel on said insulative partition so that said beam is locally substituted for an upper part of said insulative partition.

10. The wiring trunking claimed in claim 9 wherein said beam is formed integrally with said electrical insulation box.

11. The wiring trunking claimed in claim 9 wherein said beam is adapted to be attached to said electrical insulation box.

12. The wiring trunking claimed in claim 1 wherein said electrical insulation box has on the outside face of its back wall means for clipping it to a longitudinal rail provided on the back of the corresponding compartment of said wiring trunking.

* * * * *